(12) United States Patent
Tranchina (10) Patent No.: US 7,493,645 B1
(45) Date of Patent: Feb. 17, 2009

(54) CONSOLE WITH MONITOR AND WIRELESS RECEIVER

(75) Inventor: James R. Tranchina, Dix Hills, NY (US)

(73) Assignee: Audiovox Corporation, Hauppauge, NY (US)

( * ) Notice: Subject to any disclaimer, the term of this patent is extended or adjusted under 35 U.S.C. 154(b) by 827 days.

(21) Appl. No.: 09/698,915

(22) Filed: Oct. 27, 2000

(51) Int. Cl.
*H04N 7/18* (2006.01)

(52) U.S. Cl. .................... 725/75; 348/837; 340/426.16; 725/76; 725/153

(58) Field of Classification Search ............ 725/74–85, 725/133, 141, 153; 224/311; 348/552, 837; 455/569.2, 95; 340/461, 426.16
See application file for complete search history.

(56) References Cited

U.S. PATENT DOCUMENTS

| | | | |
|---|---|---|---|
| 5,345,430 A | 9/1994 | Moe | |
| 5,634,209 A | 5/1997 | Prudhomme et al. | |
| 5,775,762 A * | 7/1998 | Vitito | 296/37.7 |
| 5,794,164 A * | 8/1998 | Beckert et al. | 455/3.06 |
| 5,822,023 A * | 10/1998 | Suman et al. | 348/837 |
| 5,850,215 A | 12/1998 | Kamiya et al. | 345/204 |
| 5,946,055 A * | 8/1999 | Rosen | 348/837 |
| D413,856 S * | 9/1999 | Scribner | D12/418 |
| 6,154,658 A * | 11/2000 | Caci | 455/466 |
| 6,202,008 B1 * | 3/2001 | Beckert et al. | 701/33 |
| 6,256,317 B1 * | 7/2001 | Holloway et al. | 370/447 |
| 6,304,173 B2 * | 10/2001 | Pala et al. | 340/461 |
| 6,335,753 B1 | 1/2002 | McDonald | 348/14 |
| 6,339,455 B1 * | 1/2002 | Allan et al. | 348/837 |
| 6,356,812 B1 * | 3/2002 | Cragun | 701/1 |
| 6,374,177 B1 | 4/2002 | Lee et al. | |
| 6,414,664 B1 * | 7/2002 | Conover et al. | 345/89 |
| 6,420,975 B1 * | 7/2002 | DeLine et al. | 340/815.4 |
| 6,424,369 B1 * | 7/2002 | Adair et al. | 348/76 |
| 6,522,368 B1 * | 2/2003 | Tuccinardi et al. | 348/837 |
| 6,526,335 B1 * | 2/2003 | Treyz et al. | 701/1 |
| 6,553,567 B1 * | 4/2003 | Wugofski et al. | 725/81 |
| 6,577,928 B2 * | 6/2003 | Obradovich | 701/1 |
| 6,663,155 B1 * | 12/2003 | Malone et al. | 296/37.8 |
| 6,779,196 B1 * | 8/2004 | Igbinadolor | 725/75 |

(Continued)

OTHER PUBLICATIONS

International Search Report for PCT/US05/25420, International Filing date of Jul. 19, 2005.

(Continued)

*Primary Examiner*—Ngoc K Vu
(74) *Attorney, Agent, or Firm*—F. Chau & Associates, LLC (57) ABSTRACT

There is provided a console for a vehicle. The console includes an assembly housing adapted to mount against an interior surface of the vehicle. A wireless receiver, houseable in the assembly, is adapted to receive wireless signals from at least one input video source. A display device, houseable in the assembly and operatively coupled to the wireless receiver, is adapted to reproduce the wireless signals. The wireless signals are at least one of radio frequency, infrared, and optical signals. The console may further include a processor adapted to execute applications associated with the console, and an operating system adapted to manage the applications associated with the console. The console may also include a web browser adapted to interact with one of the Internet and the World Wide Web. The console may also further includes signal processing facilities adapted to perform at least one of signal processing and signal conversion, with respect to the wireless signals.

31 Claims, 4 Drawing Sheets

U.S. PATENT DOCUMENTS

| | | | |
|---|---|---|---|
| 6,782,245 B1* | 8/2004 | Lazzarotto et al. | 455/266.1 |
| 6,871,356 B2 | 3/2005 | Chang | 725/75 |
| 7,159,232 B1 | 1/2007 | Blackketter et al. | |
| 2001/0033736 A1 | 10/2001 | Yap et al. | 386/46 |
| 2002/0045891 A1 | 4/2002 | Clement et al. | |
| 2002/0076049 A1 | 6/2002 | Boykin et al. | |
| 2002/0077897 A1 | 6/2002 | Zellner et al. | 705/14 |
| 2002/0159270 A1 | 10/2002 | Lynam et al. | 362/492 |
| 2002/0178443 A1 | 11/2002 | Ishii | |
| 2002/0197955 A1* | 12/2002 | Witkowski et al. | 455/41 |
| 2003/0093810 A1 | 5/2003 | Taniguchi | |
| 2003/0188320 A1 | 10/2003 | Shing | 725/131 |
| 2004/0110466 A1 | 6/2004 | Perlman | 455/12.1 |
| 2004/0111755 A1 | 6/2004 | Perlman | |
| 2004/0123327 A1 | 6/2004 | Fai Ma et al. | 725/100 |
| 2005/0267994 A1 | 12/2005 | Wong et al. | |
| 2006/0294551 A1 | 12/2006 | Cholewinsky | |

OTHER PUBLICATIONS

Written Opinion of the International Searching Authority for PCT/US05/25420, International Filing Date of Jul. 19, 2005.
International Patent Application No. PCT/US05/25420, PCT Notification of Transmittal of International Preliminary Examination Report mailed Mar. 24, 2008.
Office Action mailed Mar. 26, 2008 from U.S. Appl. No. 10/898,538.
Copy of Office Action mailed Oct. 15, 2008 from corresponding U.S. Appl. No. 10/898,538.

* cited by examiner

CONSOLE WITH MONITOR AND WIRELESS RECEIVER

TECHNICAL FIELD

The present invention relates generally to vehicles and, in particular, to a console with an audio/video monitor and a wireless receiver for use in a vehicle.

BACKGROUND DESCRIPTION

As cars have been continuously updated to include new and useful features for the enjoyment and/or utility of a driver and his or her passengers, devices generally found in the home have made their way into cars as optional features. Such features include the television, the video cassette recorder (VCR), the compact disk (CD) player, and the digital video disk (DVD) player. While these features undoubtedly provide enjoyment and/or utility to the driver and passengers of a vehicle, the features are nonetheless troublesome to install and implement in a car. For example, if the items are not factory installed, then a user must generally go to an installation shop and have the items installed into their vehicle. The installation involves wiring the devices to the vehicle to receive power therefrom, as well as coupling the devices to other existing systems of the vehicle other than the power system. For example, a vehicle owner may want a car mounted television to be coupled to the existing speaker system so that passengers in the back of the vehicle (as well as any passengers in the front of the vehicle) can hear the corresponding audio.

Given the small confines of many vehicles, it may not be easy to integrate new equipment into the vehicle. Moreover, the installation process itself may result in structural damage to the vehicle when an installer improperly dismantles and/or reassembles portions of the vehicle. This is particularly true for the wiring, which often has to run from the front of the car (where the fuse bus and battery are located) to the middle and/or rear of the car.

With respect to overhead console mounted electronics, the above problems are compounded. This is due to a variety of reasons, including the fact that the overhead console is generally of limited space, and also because whatever space exists is generally overrun with wiring from existing devices such as reading lights, garage door openers, thermometers, and so forth. Further, the console, in being overhead, must be re-assembled carefully to avoid coming apart at an importune moment and potentially impeding the vision and/or concentration of the vehicle operator.

Thus, in the case of an overhead console having a television disposed therein, difficulties exist in wiring input devices (e.g., VCR) to the television as well as in wiring output devices (speakers) to the television.

Accordingly, there is a need for a console which allows for the minimum effort in installation in the vehicle, particularly with respect to wiring. Such a console could be preferably mounted overhead, or on any other interior surface of the vehicle.

SUMMARY OF THE INVENTION

The problems stated above, as well as other related problems of the prior art, are solved by the present invention, a console with an audio/video monitor and a wireless receiver.

According to a first aspect of the invention, there is provided a console for a vehicle. The console includes an assembly housing adapted to mount against an interior surface of the vehicle. A wireless receiver, houseable in the assembly, is adapted to receive wireless signals from at least one video input source. A display device, houseable in the assembly and operatively coupled to the wireless receiver, is adapted to reproduce the wireless signals.

According to a second aspect of the invention, the wireless signals are at least one of radio frequency, infrared, and optical signals.

According to a third aspect of the invention, the at least one input source includes circuitry for producing video signals and is at least one of a video cassette player (VCP), a television, a compact disk (CD) player, a digital video disk (DVD) player, and a video game player, and said at least one input source comprises a wireless transmitter for transmitting the wireless signals.

According to a fourth aspect of the invention, the console further includes a wireless joystick, detachable from the console.

According to a fifth aspect of the invention, the wireless signals are transmitted through one of a packet-switched wireless network and a circuit-switched wireless network.

According to a sixth aspect of the invention, the console further includes a processor adapted to execute applications associated with the console, and an operating system adapted to manage the applications associated with the console.

According to a seventh aspect of the invention, the console further includes a web browser adapted to interact with one of the Internet and the World Wide Web.

According to an eighth aspect of the invention, the browser is adapted to access the World Wide Web using wireless Application Protocol (WAP).

According to a ninth aspect of the invention, the console further includes at least one of a wireless keyboard and a wireless mouse, the wireless keyboard and the wireless mouse being detachable from the console.

According to a tenth aspect of the invention, the console further includes a voice recognition system adapted to control the console and functions associated therewith.

According to an eleventh aspect of the invention, the console further includes signal processing facilities adapted to perform at least one of signal processing and signal conversion, with respect to the wireless signals.

According to a twelfth aspect of the invention, the console further includes a text-to-speech system.

According to a thirteenth aspect of the invention, a vehicle occupant sends media to the console for display via a wireless signal from one of a personal digital assistant (PDA), a hand held personal computer (PC), and a smart phone.

According to a fourteenth aspect of the invention, the console further includes a wireless transmitter.

According to a fifteenth aspect of the invention, the display device is mounted in the console in one of a non-fixed configuration and a fixed configuration.

According to a sixteenth aspect of the invention, the display device employs one of a liquid crystal display (LCD), light emitting diodes (LEDs), and a gas plasma.

According to a seventeenth aspect of the invention, the liquid crystal display is based upon one of active matrix technology and passive matrix technology.

According to an eighteenth aspect of the invention, the display device employs touch screen technology.

According to a nineteenth aspect of the invention, the wireless receiver is disposed within the display device.

According to a twentieth aspect of the invention, the wireless receiver is disposed external to the display device.

According to a twenty first aspect of the invention, the wireless signals include at least one of audio and video.

According to a twenty second aspect of the invention, the wireless receiver includes at least one of a photosensitive device and an antenna.

According to a twenty third aspect of the invention, the wireless transmitter includes at least one of an optical transmission device and an antenna.

According to a twenty fourth aspect of the invention, the assembly housing is adapted to mount against one of an overhead surface of the vehicle and a roof of the vehicle.

According to a twenty fifth aspect of the invention, there is provided a console for a vehicle. The console includes an assembly housing adapted to mount against an interior surface of the vehicle. A display device, houseable in said assembly, is adapted to reproduce wireless signals. The display device includes a wireless receiver, disposed in the display device, adapted to receive the wireless signals from at least one input source.

According to a twenty sixth aspect of the invention, there is provided a console for a vehicle. The console includes an assembly housing adapted to mount against an interior surface of the vehicle. A display device, houseable in the assembly, is adapted to reproduce wireless signals. A wireless transceiver, operatively coupled to the display device, is adapted to send and receive the wireless signals from at least one input source.

According to a twenty seventh aspect of the invention, there is provided a console for a vehicle. The console includes an assembly housing adapted to mount against an interior surface of the vehicle. A wireless receiver, houseable in the assembly, is adapted to receive wireless signals from at least one video input source. A display device, houseable in the assembly and operatively coupled to the wireless receiver, is adapted to reproduce the wireless signals. A wireless transmitter is adapted to transmit wireless control signals to the wireless receiver, the wireless control signals for configuring at least one of controls and applications on the display device.

According to a twenty eighth aspect of the invention, the wireless transmitter is adapted to be detachable from the console.

According to a twenty ninth aspect of the invention, the wireless transmitter includes a processor and associated memory for executing and storing programs, respectively.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof.

Preferably, the present invention is implemented as a combination of both hardware and software, the software being an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

To facilitate a clear understanding of the present invention, a brief description of the invention will now be given, followed by definitions of terms used herein. As noted above, the invention is directed to a console with a monitor and a wireless receiver. It is to be noted that the terms "monitor" and "display device" are used interchangeably herein. According to the invention, the wireless receiver receives wireless signals and provides the wireless signals to the monitor for display, as well as to other, optional equipment (e.g., speakers). The wireless receiver may be located within or external to the display device. The device from which the wireless receiver receives the wireless signals is interchangeably referred to herein as the "input device", the "transmitting device", or the "source device".

The wireless signals can be any type of wireless signal including, but not limited to, radio frequency, infrared, and optical signals. For radio frequency signals, an antenna may be used to enhance reception. It is to be noted that the current transmission capability (bandwidth) of infrared signals is approximately 1.5 to 2.0 Mbits/sec, with a maximum projected bandwidth of 16 Mbits/sec.

The wireless signals may be transmitted through a packet-switched wireless network or a circuit-switched wireless network. In a packet-switched network, there is no single, unbroken connection between sender and receiver; instead, the information is broken into small packets and sent over many different routes at the same time. The packets are then reassembled at the receiving end. In contrast, in a circuit-switched network, once a connection is made, that part of the network is dedicated only to that single connection.

Figure 1:
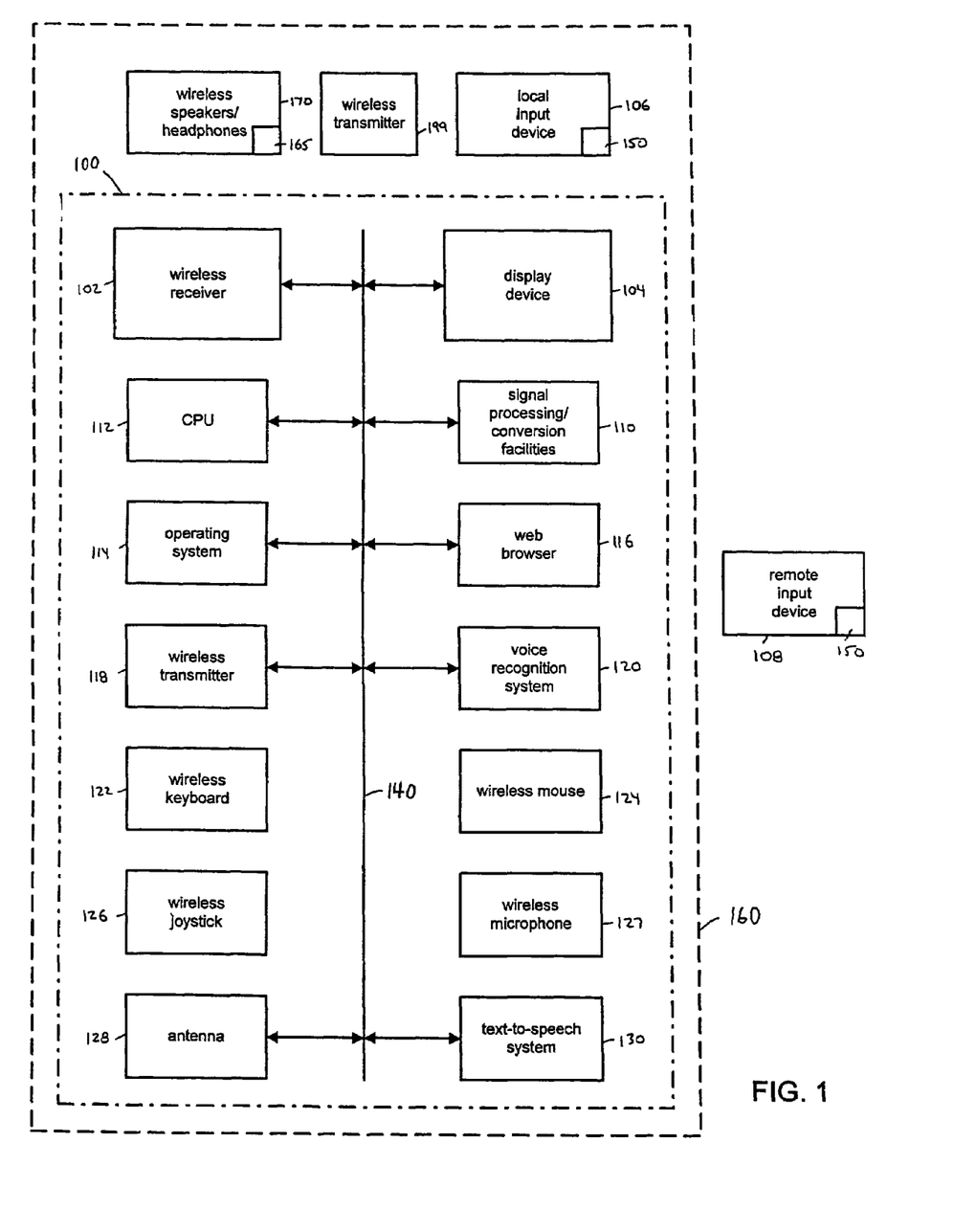
FIG. 1 is a block diagram illustrating the elements of a console 100 according to an illustrative embodiment of the invention.

FIG. 1 is a block diagram illustrating the elements of a console 100 according to an illustrative embodiment of the invention. The console 100 is ultimately installed in a vehicle 160. The console 100 includes a wireless receiver 102, a display device 104, a local input device(s) 106, a remote input device(s) 108, facilities for performing signal processing and/or signal conversion 110 (hereinafter "signal processing/conversion facilities"), a processor (CPU) 112, an operating system 114, a web browser 116, a wireless transmitter 118, a voice recognition system 120, a wireless keyboard 122, a wireless mouse 124, a wireless joystick 126, a wireless microphone 127, a text-to-speech system 130, and an antenna 128.

Some of the elements shown in FIG. 1 may be included in the console, in compartments comprised therein (not shown), or they may be separate from the console but nonetheless intended to interact with the console. The elements shown in FIG. 1 may be connected by one or more buses 140.

All of the elements shown in FIG. 1 except for the remote input device 108 are included in the vehicle 160. The remote input device 108 is external to the vehicle 160.

All of the elements shown in FIG. 1 except for the remote input device 108 are included in the vehicle 140. The remote input device 108 is external to the vehicle 140.

It is to be appreciated that the display device is not limited to any particular kind of display device. Accordingly, display devices may be used which include, but are not limited to, liquid crystal displays (LCDs), light emitting diodes (LEDs), and gas plasma. It is to be further appreciated that any variations of the aforementioned types of displays may be used. For example, with respect to liquid crystal displays, active matrix (e.g., thin film transistor) technology or passive matrix (e.g., dual scan) technology may be employed. The display device may also employ touch screen technology, so that users can interact with the console by either touching the screen or placing a specified device (e.g., electrostatic pen) near the screen. In a preferred embodiment of the invention, a liquid crystal display is employed which uses active matrix technology.

It is to be noted that the wireless receiver may receive the wireless signals from many sources. For example, the local input device(s) 106, includes, but is not limited to, a video cassette player (VCP), a television, a compact disk (CD) player, a digital video disk (DVD) player, a personal computer (PC), a pager, and a video game player.

The wireless receiver may also receive the wireless signals from any remote wireless device. Thus, the remote input device(s) 108 includes, but is not limited to, a satellite (or satellite network) that provides multimedia content, or any other remote wireless device or network (e.g., global positioning system (GPS), cellular, and so forth). Given the prevalent use of satellites for the delivery of multimedia content (e.g., movies, telephone service, Internet and World Wide Web (the Web) content (e.g., streaming video), and so forth), this capability provides a seemingly endless supply of varying media types to a vehicle, with the significant advantage of not requiring additional, on-board equipment such as VCPs, CD players, DVD players, televisions, and so forth. By not requiring the installation of an input device(s) in the vehicle, insurance costs are reduced should the vehicle be stolen.

In any event, each input device (i.e., local input device(s) 106 and remote input device(s) 108) should have a wireless transmitter 150 from which the wireless signals are transmitted.

Figure 2:
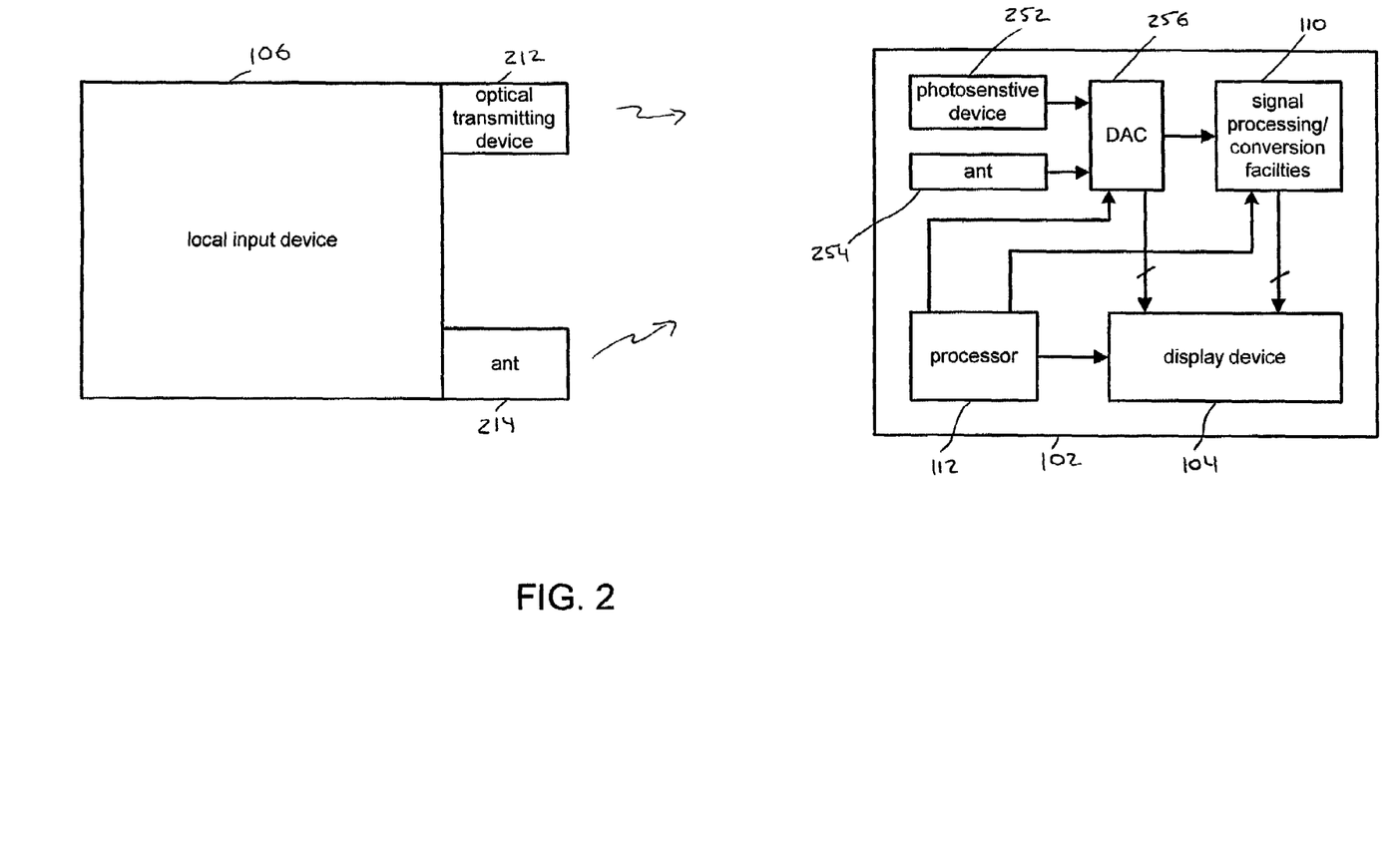
FIG. 2 is a diagram illustrating a local input device 106 interacting with the wireless receiver 102 based on optical and/or RF transmission, according to an illustrative embodiment of the invention.

FIG. 2 is a diagram illustrating a local input device 106 interacting with the wireless receiver 102 based on optical and/or RF transmission, according to an illustrative embodiment of the invention. The local input device 106 includes an optical transmitting device 212 (e.g., an LED, a laser, and so forth) and an antenna 214. The wireless receiver 102 includes a photosensitive device 252 (e.g., a phototransistor, a solar cell(s), a SEED (self-optic effect device), and so forth) and an antenna 254. The optical transmitting device 212 and the photosensitive device 254 are used for wireless transmission and reception of optical signals, respectively. The antenna 214 and the antenna 254 are used for wireless transmission and reception of RF signals, respectively.

In the case of wireless optical transmission, the optical transmitting device 212 wirelessly transmits optical (digital) signals to the wireless receiver 102 by pulsing its light output (e.g., off equals a zero (0) and on equals a one (1)). The photosensitive device 252 in the wireless receiver detects the optical signals wirelessly transmitted by the optical transmitting device 212.

The wireless receiver 102 also includes a digital-to-analog converter (DAC) 256 for converting the digital signals into analog signals. The analog signals are then provided to the display device 104 either directly or after processing by the signal processing/conversion facilities 110. Such processing by the signal processing/conversion facilities 110 may include, for example, filtering of the analog signal.

It is to be appreciated that the processor 112 may be used to control the functions of the DAC 256 and the signal processing/conversion facilities 110. It is to be further appreciated that the DAC 256 may be separate from (as shown) or part of the signal processing/conversion facilities 110.

The local input source 106 in the example of FIG. 2 may be a compact disk (CD) player, a digital video disk (DVD) player, and so forth. In the case of, for example, a DVD player, the digital output therefrom is transmitted wirelessly from the optical transmitting device 212 to the photosensitive device 252. The DAC 256 may then be used to generate three separate analog signals (left audio channel, right audio channel, and video). Alternatively, the DAC 256 may simply convert the wireless digital signal to a composite analog signal, which is then separated by the signal processing/conversion facilities 110 (when the DAC 256 is separate from the signal processing/conversion facilities 110).

The preceding description regarding the functions of the DAC 256 and the signal processing/conversion facilities 110 may also be applied in the case of RF transmission. In such a case, the transmission and reception functions of the optical transmitting device 212 and the photosensitive device 252 are replaced by those of the antennas 214 and 254, respectively. That is, the antenna 214 is used to wirelessly transmit an RF signal which is then received by the antenna 254. A modulator/demodulator may be included or associated with the antennas 214 and 254 to perform such functions as are known to one of ordinary skill in the related art.

In another embodiment of the invention, a DAC and signal processing/conversion facilities may be located in the local input device 106, and controlled by a programmable processor therein. The processor may be then programmed to function with the elements of the wireless receiver 102. Given the teachings of the invention provided herein, one of ordinary skill in the related art will contemplate these and other optical transmitting devices, photosensitive devices, and configurations of the elements of the invention which allow for the transmission and reception of any type of wireless signal (e.g., analog and digital) and appropriate processing/conversion to facilitate reproduction of the content of the wireless signals provided by the local input device 106.

It is to be appreciated that the console of the present invention may include more than one display device 104, and more than one wireless receiver 102. In the case of more than one display device, two or more different sources (e.g., DVD player, satellite) may be used to feed each of the monitors.

One of the primary advantages of the invention is that input devices (local input device(s) 106 and remote input device(s) 108) can be located in the console 100 or at any other location within range of the wireless receiver 102. As noted above, this may even include a satellite positioned in the atmosphere.

According to one embodiment of the invention, the local input device(s) 106 (e.g., VCP, CD player, and/or DVD player) is located near the driver to enable driver control of the media content watched by passengers (e.g., children, teenagers). Alternatively, the driver can be left to concentrate on the task of driving, with the passengers able to load media into a local input device(s) 106 located at the middle/back of the vehicle (not within the console 100 or too proximate to the console 100).

The signal processing/conversion facilities 110 may perform such processing/conversion prior to the wireless signals being provided to the display device 104 or any other device (e.g., speakers). The signal processing/conversion facilities 110 may include, but are not limited to, Digital Signal Processors (DSPs), and facilities for performing encoding/decoding, encrypting/decrypting, compressing/decompressing, analog-to-digital conversion (ADC), digital-to-analog conversion (DAC), and error correction. Such error correction may include, but is not limited to, Cyclic Redundancy Checking (CRC), Error Correction Code or Error Checking and Correcting (ECC), checksum, and so forth. With respect to encoding/decoding, encrypting/decrypting, and compressing/decompressing, the former of each pair is performed by the input device (local input device(s) 106 and/or remote input device(s) 108) and the latter is performed by the wireless receiver 102. Of course, bi-directional transmissions may also be employed by the console of the invention. For example, the wireless receiver 102 may communicate with the input device(s) (106 and/or 108) for control purposes. In such a case, the input device(s) (106 and/or 108) may employ a wireless transceiver instead of simply a wireless transmitter, and the wireless receiver 102 and the wireless transmitter 118 of the console 100 may be replaced by a wireless transceiver. Such a wireless transceiver may be either half duplex or full duplex.

In many cases, the facilities described above may be implemented by one or more codecs. In other cases, additional and/or other circuitry may be required.

It is to be noted that the wireless signals may be encoded to prevent interference between different input devices in the vehicle 160 and between an input device in the vehicle 160 and an input device in a proximate vehicle. In such a case, the transmitter 150 of the input device may include facilities for transmitting the wireless signals that are based upon, for example, Spread Spectrum technology.

It is to be appreciated that the signal processing/conversion facilities 110 described above with respect to the console may be located separate from or as part of the wireless receiver 102. It is to be further appreciated that one of ordinary skill in the related art will contemplate these and various other facilities for performing signal processing and/or signal conversion, while maintaining the spirit and scope of the invention.

The processor 112 may be one or more processors. The processor may be used to control and/or interact with any of the elements associated with the console. The operating system 114 may be a full blown operating system (including, but not limited to, LINUX, WINDOWS 95, 98, 2000, and so forth). Alternatively, the operating system 114 may be a streamlined operating system (including, but not limited to WINDOWS CE).

The browser 116 displays Internet and/or World Wide Web (the Web) content, and allows the user to interact with the same. The browser 116 may be any browser which is capable of interpreting a markup language (including, but not limited to, Wireless Markup Language (WML), General Markup Language (GML), Standard Generalized Markup Language (SGML), Hypertext Markup Language (HTML), Extensible Markup Language (XML), and so forth), other computer software language, and/or information sent via a protocol (including, but not limited to HyperText Transfer Protocol (HTTP), File Transfer Protocol (FTP), Transmission Control Protocol (TCP), Internet Protocol (IP) and so forth).

According to an illustrative embodiment of the invention, the browser 116 accesses the web using Wireless Application Protocol (WAP). WAP is a specification for a set of communication protocols that standardize the way in which wireless devices can be used for Internet access. WAP uses what is referred to as the Wireless Markup Language (WML), which is a streamlined version of HTML for small screen displays. WAP also uses WMLScript, which is a compact JavaScript-like language. WAP also supports handheld input methods such as a keypad and voice recognition. It is to be appreciated that WAP is device independent.

The wireless transmitter 118 transmits control and/or other information to the input device(s) (106 and/or 108) and/or transmits audio to a speaker(s) having a wireless receiver 165 (e.g., wireless speakers/wireless headphones 170). In the case of wireless headphones 170, the display device 104 may be viewed by a vehicle passenger without the other passengers and/or driver hearing the accompanying audio. In a preferred embodiment of the invention, wireless speakers 170, each having a wireless receiver 165 for receiving wireless signals from the wireless transmitter 118, are employed to minimize the wiring in the vehicle.

A wireless transmitter 199 may be employed by a vehicle passenger to wirelessly transmit signals for configuring controls or applications on the display. Such signals may be transmitted to the display device 104 for receipt by the wireless receiver 102. The wireless transmitter 199 may include a processor and associated memory for executing and storing programs, respectively. The programs may be used to control many different types of devices including some or all of the input devices 106 and other electronic devices such as, for example, a cellular telephone. In the latter case, the wireless transmitter 199 may be used by a user to control the cellular telephone, which may be built into the vehicle. In a preferred embodiment of the invention, the wireless transmitter 199 is operatively coupled to the controls of the accessories commonly found in the dashboard of an automobile such as, for example, climate control and the controls for the radio and/or stereo. The wireless transmitter 199 transmits control configuration signals to the wireless receiver 102 for display on the display device 104. The display device 104, in turn, displays a plurality of control modules or devices, e.g., the keypad of a cellular phone and controls for selecting radio channels for selection via touch screen controls displayed on the display device 104. Given the teachings of the invention provided herein, one of ordinary skill in the related art will contemplate these and various other applications for the wireless transmitter 199.

The voice recognition system 120, the wireless keyboard 122, the wireless mouse 124, the wireless joystick 126, and the wireless microphone 127 are used to input information, control the console and functions corresponding thereto, and/or play a video game. It is to be noted that the wireless microphone may be part of, or separate from, the voice recognition system 120. The console 100 may include a compartment or housing assembly for housing the wireless keyboard 122, the wireless mouse 124, the wireless joystick 126, and the wireless microphone 127, which may be removed therefrom when in use.

The text-to-speech (tts) system 130 may perform various functions with respect to the console 100, as is readily apparent to one of ordinary skill in the related art. For example, the tts system 130 may be used to convert WEB books and/or other textual media (e.g., newspapers, magazines, stock quotes, weather reports, and so forth) to speech for reproduction by, for example, wireless headphones or a speaker(s) (either existing, special purpose, or included in the display device 104).

The invention facilitates meetings on the go, where a group of people in a vehicle such as a limousine, van, and so forth, can be shown a slide or moving picture show by having the same beamed into the display through the wireless receiver. Many current electronic devices such as personal digital assistants (PDAs) have the ability to transmit information via infrared signals (e.g., PALM PILOT). Thus, an individual in the vehicle can send information to the display for the other individuals in the vehicle to see. The transmitting device in this case can be any device having the capability of transmitting wireless signals, including, but not limited to, a PDA, a hand held personal computer (PC), a laptop PC, a smart phone, and so forth. Such a device may be considered to be encompassed by either local 106 and/or remote input device 108.

The preceding description of the console has primarily focused on features that may be included in the console to enhance the operation thereof. A description of mounting arrangements for the console will now be given.

In a preferred embodiment of the present invention, the display device 104 of the console is mounted in a flip fashion. That is, the display device 104 is flipped-down when in use, and flipped-up when not in use. If the display device 104 is mounted flush with the console, it may be disguised should the car be broken into. Moreover, items such as a sunglass holder may be mounted at the outer face of the console (the face opposing the display portion thereof) to further disguise the display device.

Alternatively, the display device may be mounted prominently in the console so as to constantly be in the view of the occupants of the vehicle.

Figure 3:
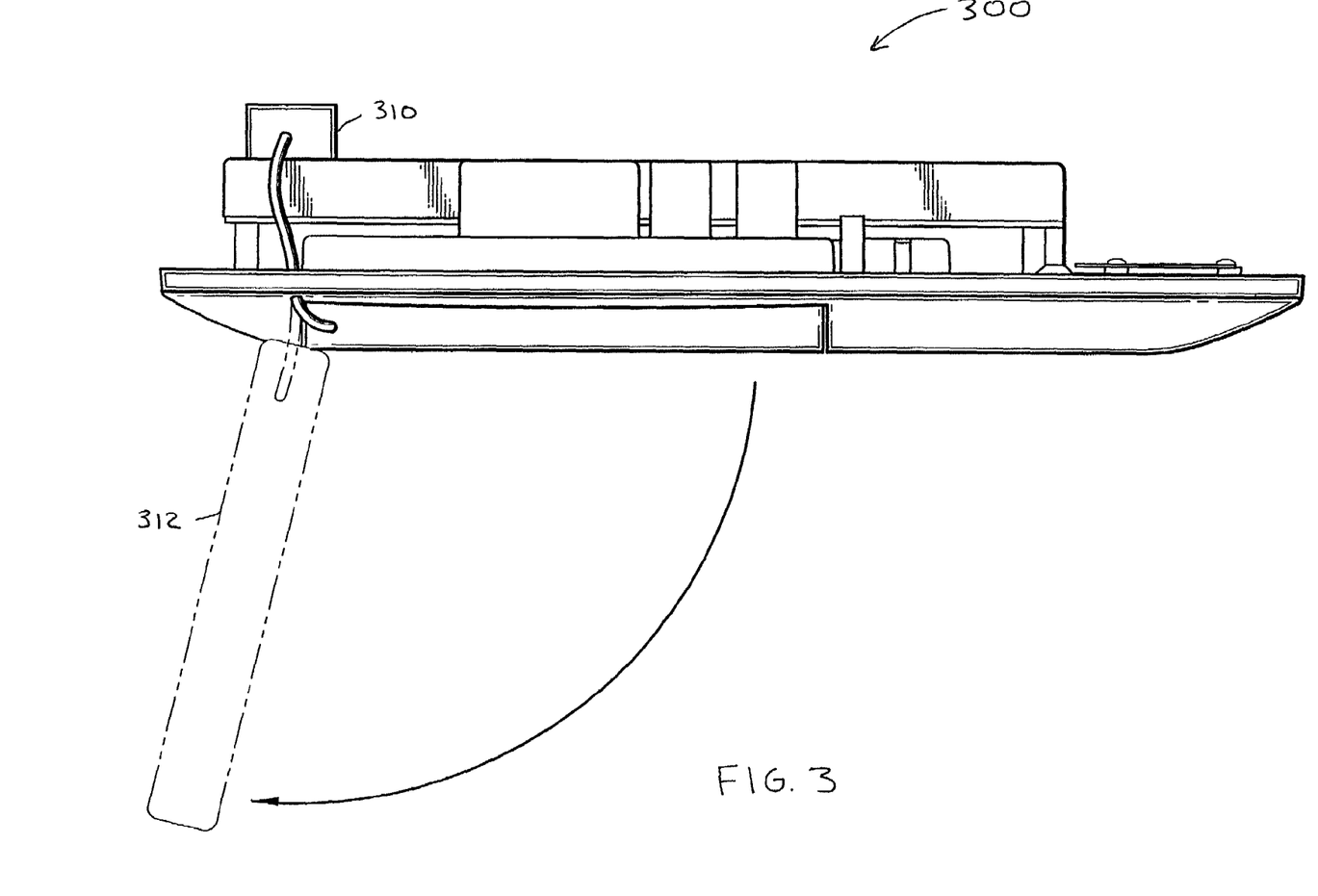
FIG. 3 is a block diagram illustrating a console 300 according to an illustrative embodiment of the invention.
Figure 4:
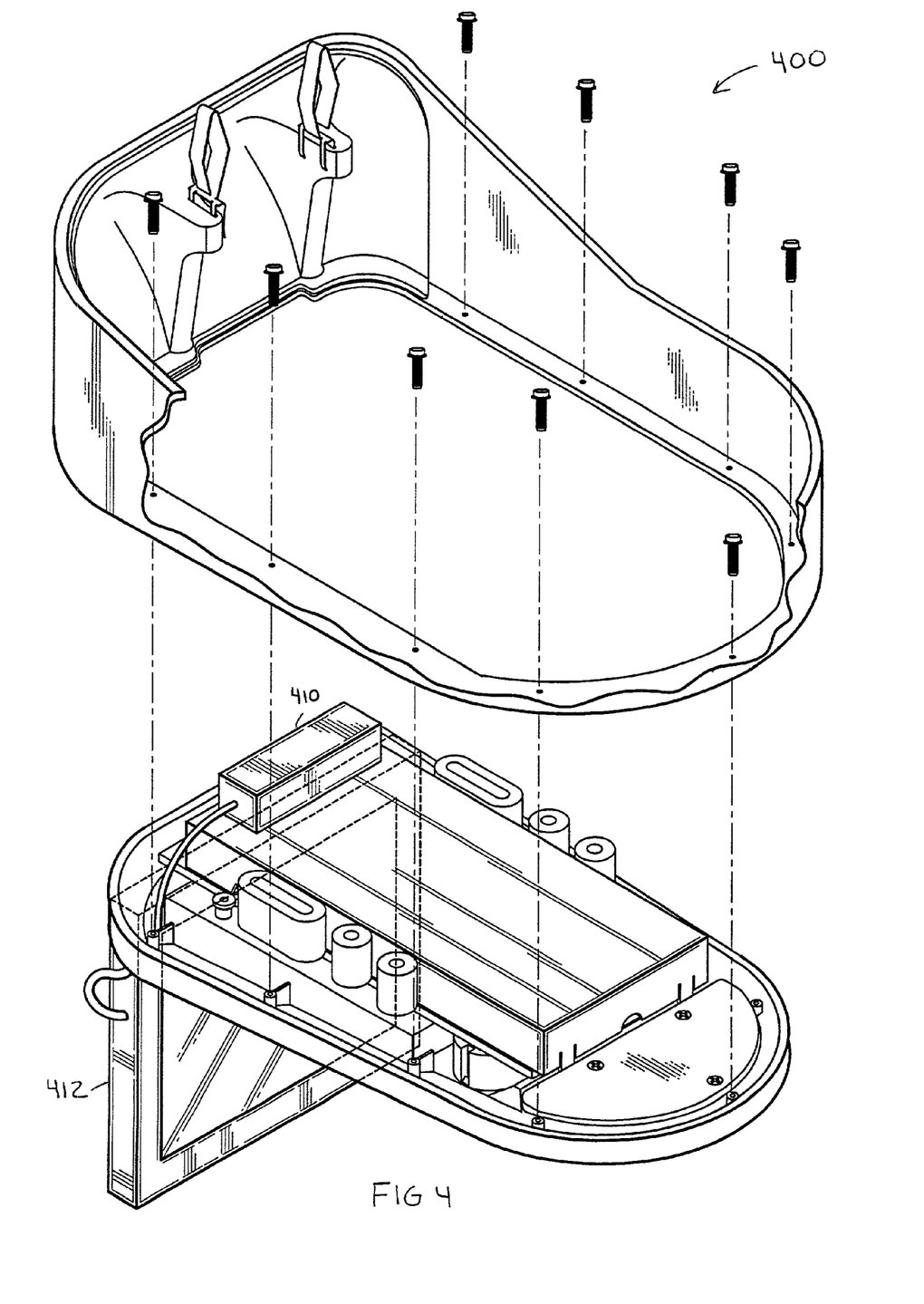
FIG. 4 is a block diagram illustrating a console 400 according to another illustrative embodiment of the invention.

FIGS. 3 and 4 illustrate various configurations of a console according to the invention. The Figures are shown with the minimum number of elements, so that the mounting arrangement of the display is emphasized.

FIG. 3 is a block diagram illustrating a console 300 according to an illustrative embodiment of the invention. In the embodiment of FIG. 3, the display device is mounted overhead in a flip configuration. The console 300 includes a wireless receiver 310 and a display device 312. The display device 312 is mounted so as to flip down (e.g., 90 degrees) along the y-axis.

FIG. 4 is a block diagram illustrating a console 400 according to another illustrative embodiment of the invention. In the embodiment of FIG. 4, the display device is mounted overhead in a non-flip configuration. The console 400 includes a wireless receiver 410 and a display device 412. Although FIGS. 3 and 4 illustrate the console being mounted against the interior roof of the vehicle, the console may be mounted against any interior surface(s) of the vehicle including, for example, the front portion of the vehicle or a combination of the roof and the front portion of the vehicle.

It is to be noted that, in addition to the above described elements, the console according to the invention may include any of the usual items found in a console for a vehicle, including, but not limited to, a compartment for holding/protecting sunglasses, another compartment for holding/protecting a garage door opener, yet another compartment for general storing/protecting of items (e.g., keys, license, registration, and so forth), a reading/map lamp assembly, a clock, and a compass. Moreover, the console may include controls for other elements/systems of the vehicle such as controls for the air conditioning and heating systems and the audio system.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An overhead console for a vehicle media system, comprising:
   an assembly housing adapted to mount against an overhead interior surface of the vehicle;
   a wireless receiver mounted to said assembly housing and adapted to receive wireless signals from at least one video input source;
   a wireless transmitter;
   a display device pivotally mounted to said assembly housing and operatively coupled to said wireless receiver, wherein the display device is adapted to reproduce the wireless signals and movement of the display device is limited to pivoting, and wherein the display device is the primary display device for the media system and is positioned overhead on the console for principal viewing by passengers;
   a processor adapted to execute applications associated with said console; and
   a computer operating system adapted to manage the applications associated with said console, wherein:
      the wireless receiver, the display device, the processor and the computer operating system are connected by a bus,
      media is wirelessly sent to the console for display from one of a portable personal digital assistant (PDA) and a portable personal computer (PC), and
      control signals to control operation of the portable PDA or the portable PC are wirelessly sent from the console to the portable PDA or the portable PC via the wireless transmitter.

2. The console according to claim 1, wherein the wireless signals are at least one of radio frequency, infrared, and optical signals.

3. The console according to claim 1, wherein said at least one input source includes circuitry for producing video signals and is at least one of a video cassette player (VCP), a television, a compact disk (CD) player, a digital video disk (DVD) player, and a video game player, and said at least one input source comprises a wireless transmitter for transmitting the wireless signals.

4. The console according to claim 3, further comprising a wireless joystick, detachable from said console.

5. The console according to claim 1, wherein the wireless signals are transmitted through one of a packet-switched wireless network and a circuit-switched wireless network.

6. The console according to claim 1, further comprising a web browser adapted to interact with one of the Internet and the World Wide Web.

7. The console according to claim 6, wherein said browser is adapted to access the World Wide Web using wireless Application Protocol (WAP).

8. The console according to claim 1, further comprising at least one of a wireless keyboard and a wireless mouse, said wireless keyboard and said wireless mouse being detachable from said console.

9. The console according to claim 1, further comprising a voice recognition system adapted to control said console and functions associated therewith.

10. The console according to claim 1, further comprising signal processing facilities adapted to perform at least one of signal processing and signal conversion, with respect to the wireless signals.

11. The console according to claim 10, further comprising a text-to-speech system.

12. The console according to claim 1, wherein said display device employs one of a liquid crystal display (LCD), light emitting diodes (LEDs), and a gas plasma.

13. The console according to claim 12, wherein said liquid crystal display is based upon one of active matrix technology and passive matrix technology.

14. The console according to claim 12, wherein said display device employs touch screen technology.

15. The console according to claim 1, wherein said wireless receiver is disposed within said display device.

16. The console according to claim 1, wherein said wireless receiver is disposed external to said display device.

17. The console according to claim 1, wherein the wireless signals comprise at least one of audio and video.

18. The console according to claim 1, wherein said wireless receiver comprises at least one of a photosensitive device and an antenna.

19. The console according to claim 3, wherein said wireless transmitter of said at least one input source comprises at least one of an optical transmission device and an antenna.

20. The console according to claim 1, wherein said assembly housing is adapted to mount against one of an overhead surface of the vehicle and a roof of the vehicle.

21. The console according to claim 1, wherein a vehicle occupant sends media to said console for display via a wireless signal from a smart phone.

22. The console according to claim 1, wherein the wireless signals are infrared.

23. The console according to claim 1, wherein the wireless signals are optical.

24. The console according to claim 1, wherein the display device pivots downward and away from the assembly housing from a stowed position to a viewing position.

25. An overhead console for a vehicle media system, comprising:
an assembly housing adapted to mount against an overhead interior surface of the vehicle;
a web browser adapted to interact with one of the Internet and the World Wide Web;
a wireless transmitter;
a computer operating system managing the web browser; and
a display device, houseable in said assembly housing, adapted to reproduce wireless signals, said display device comprising:
a wireless receiver, disposed in said display device, adapted to receive the wireless signals from at least one input source, wherein:
hardware corresponding to the web browser, the display device and the wireless receiver are connected by a bus
media is wirelessly sent to the console for display from a portable telephone, wherein the display device is the primary display device for the system and is positioned overhead on the console for principal viewing by passengers, and
control signals to control operation of the portable telephone are wirelessly sent from the console to the portable telephone via the wireless transmitter.

26. An overhead console for a vehicle media system, comprising:
an assembly housing adapted to mount against an overhead interior surface of the vehicle;
a display device pivotally mounted to said assembly housing, wherein the display device is adapted to reproduce wireless signals and movement of the display device is limited to pivoting, and wherein the display device is the primary display device for the system and is positioned overhead on the console for principal viewing by passengers;
a computer operating system adapted to manage applications associated with the console; and
a wireless transceiver operatively coupled to said display device, wherein the wireless transceiver is mounted to the assembly housing and is adapted to send and receive the wireless signals from a plurality of input sources, wherein at least one input source is part of a network external to the vehicle, and another input source includes one of a portable personal digital assistant (PDA) and a portable personal computer (PC) wirelessly transmitting media to the console for display, and wherein control signals to control operation of the portable PDA or the portable PC are wirelessly sent from the console to the portable PDA or the portable PC via the wireless transceiver.

27. The console according to claim 26, wherein the display device pivots downward and away from the assembly housing from a stowed position to a viewing position.

28. An overhead console for a vehicle media system, comprising:
an assembly housing adapted to mount against an overhead interior surface of the vehicle;
a wireless receiver, houseable in said assembly housing, adapted to receive wireless signals from at least one video input source;
a first wireless transmitter;
a display device, houseable in said assembly housing and operatively coupled to said wireless receiver, adapted to reproduce the wireless signals, wherein the display device is the primary display device for the system and is positioned overhead on the console for principal viewing by passengers;
a computer operating system adapted to manage applications associated with the console; and
a second wireless transmitter, adapted to transmit wireless control signals to the wireless receiver, the wireless control signals for configuring at least one of controls and applications on the display device, whereby the display device displays control modules, wherein media is wirelessly sent to the console for display from a portable personal computer (PC), and wherein control signals to control operation of the portable PC are wirelessly sent from the console to the portable PC via the first wireless transmitter.

29. The console according to claim 28, wherein said second wireless transmitter is adapted to be detachable from said console.

30. The console according to claim 28, wherein said second wireless transmitter comprises a processor and associated memory for executing and storing programs, respectively.

31. The console according to claim 28, wherein the control modules are selected via touch screen controls displayed on the display device.

* * * * *